Sept. 25, 1956 S. F. ARMINGTON 2,764,204
TIRE TRACKS WITH TIRE ENGAGING LUGS
Filed Dec. 4, 1952 3 Sheets-Sheet 1

INVENTOR.
Stewart F. Armington
BY
Hyde, Meyer, Baldwin & Doran
ATTORNEYS

Sept. 25, 1956     S. F. ARMINGTON     2,764,204
TIRE TRACKS WITH TIRE ENGAGING LUGS
Filed Dec. 4, 1952     3 Sheets-Sheet 2

INVENTOR.
Stewart F. Armington
BY
Hyde, Meyer, Baldwin & Doran
ATTORNEYS

Sept. 25, 1956      S. F. ARMINGTON      2,764,204
TIRE TRACKS WITH TIRE ENGAGING LUGS Filed Dec. 4, 1952                       3 Sheets—Sheet 3

INVENTOR.
Stewart F. Armington
BY
Hyde, Meyer, Baldwin & Doran
ATTORNEYS

United States Patent Office 2,764,204
Patented Sept. 25, 1956

2,764,204

TIRE TRACKS WITH TIRE ENGAGING LUGS

Stewart F. Armington, Willoughby, Ohio, assignor, by mesne assignments, to General Motors Corporation, Detroit, Mich., a corporation of Delaware Application December 4, 1952, Serial No. 324,007

4 Claims. (Cl. 152—182)

This invention relates to improvements in a combination of a large pneumatic tire and an endless track completely surrounding and partially embracing the tire, said track comprising a plurality of rigid shoes with articulating connections between adjacent shoes, the shoes having ridges which engage grooves in the tire.

One of the objects of the present invention is to provide a novel arrangement whereby a large size pneumatic tire having a normal working pressure not substantially over 25 pounds per square inch is provided with an armored protection which at the same time increases the ground gripping properties of the combination tire and track for off-the-highway operation of the vehicle.

Another object of the present invention is to provide a novel combination between a track having a plurality of shoes with articulating connections between them, and wherein ridges on the shoes engage in grooves in the tire tread so as to hold the track tightly on the tire, to prevent slippage between the tire and track, and to gear together the tire, the track and the ground.

A further object of the present invention is to provide a novel track shoe capable of carrying out the above-described functions.

Other objects and advantages of my invention will be apparent from the accompanying drawings and description and the essential features thereof will be set forth in the appended claims.

In the drawings,

Fig. 7 is a transverse sectional view of a shoe taken along the line 7—7 of Fig. 5; while

Off-the-highway vehicles use large pneumatic tires, both for the purpose of carrying the load, and for the purpose of floating the load on a large supporting area which is especially necessary where ground conditions are poor for supporting loads, such as in mud and sand. With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire, so as to give an armored protective effect to the pneumatic tire, and at the same time increasing the tractive effect when such tires are driven in order to propel the vehicle. It is important that an endless track of this type be firmly engaged with the tire at all times so that the tire does not creep within the track and so wear away the rubber. The present invention accomplishes this by providing ridges on the track shoes which engage within grooves in the tire tread, and the parts are so designed that the track is always tight upon the tire and the ridges of the track shoes are always engaged in the grooves in the tire tread.

The tire illustrated herein is an 18.00 x 25 tire which means that its overall diameter is approximately five feet. My invention is intended for successful operation with such a tire utilizing an internal pressure of 25 pounds per square inch or less.

Figure 3:
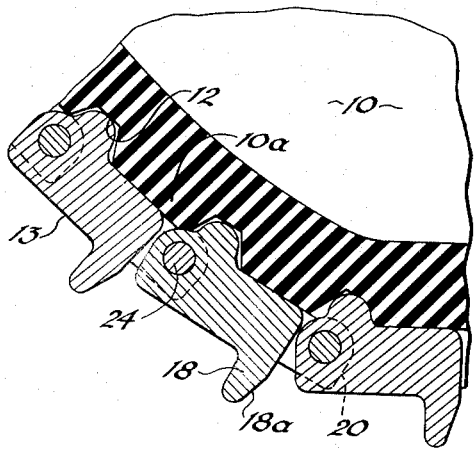
Fig. 3 is an enlarged fragmental sectional view of the lower left-hand portion of Fig. 1.

The tire 10, illustrated herein, is of this character. It will be understood that such tires usually have inner tubes but for clarity the inner tube has been omitted from Figs. 1 and 3. The tire is shown mounted on a conventional rim 11.

Figure 2:
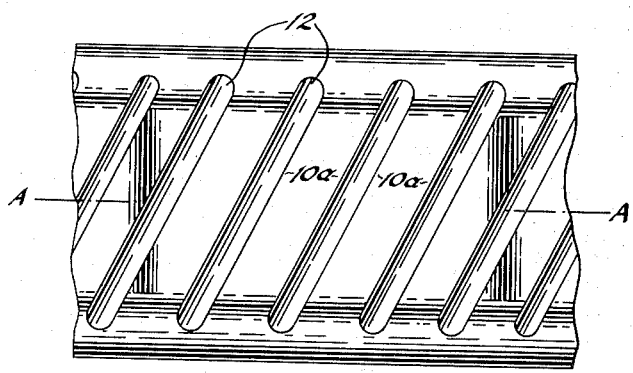
Fig. 2 is a fragmental view taken along the line 2—2 of Fig. 1 and looking upwardly at the ground engaging portion of the tire.

For use in the present combination, the tire tread is provided with a plurality of spaced parallel grooves 12 extending crosswise of the tire tread. As shown in Fig. 2, the grooves of the present embodiment extend at an angle of about 60 degrees to the line A—A extending around the periphery of the tire centrally of its tread. It should be understood, however, that by "crosswise" in the specification and claims I include other angles, including grooves which might extend at any angle with the line A—A.

The track 13 is composed of a plurality of shoes 14, preferably of iron or steel, and having articulating or hinged connections between adjacent shoes. As clearly seen in Figs. 4 to 8 inclusive, each of these shoes 14 is longer crosswise of the tire than its extent circumferentially of the tire. Each shoe has a generally flat tread-engaging inner surface 15 carrying the tire groove engaging ridges 16a and 16b. At each end of the central portion 15, the surfaces of the shoe toward the tire incline upwardly and away from the central portion of the shoe as indicated at 17. These end portions 17 partially embrace the side walls of the tire when the track is in position assembled on the tire as in Fig. 1. It will be clear from Figs. 5, 6 and 7 that the portions 17 of each shoe are of metal of comparatively thin section but of such a thickness to give sufficient strength to the shoe without being very heavy. The central portion 15 is thicker because it supports the tire engaging ridges on the one side and the ground engaging grouser on its other side. This grouser, shown at 18, might be of various forms, but is here shown as V-shape having the apex of the V at 18a located centrally of one side of the shoe and the ends of the legs of the V at 18b terminating at the outer ends of the other face of the shoe. The portions 18b of the grouser are connected by walls 19 which extend upwardly and join integrally with the wings 17 on that side of the shoe.

Figure 4:
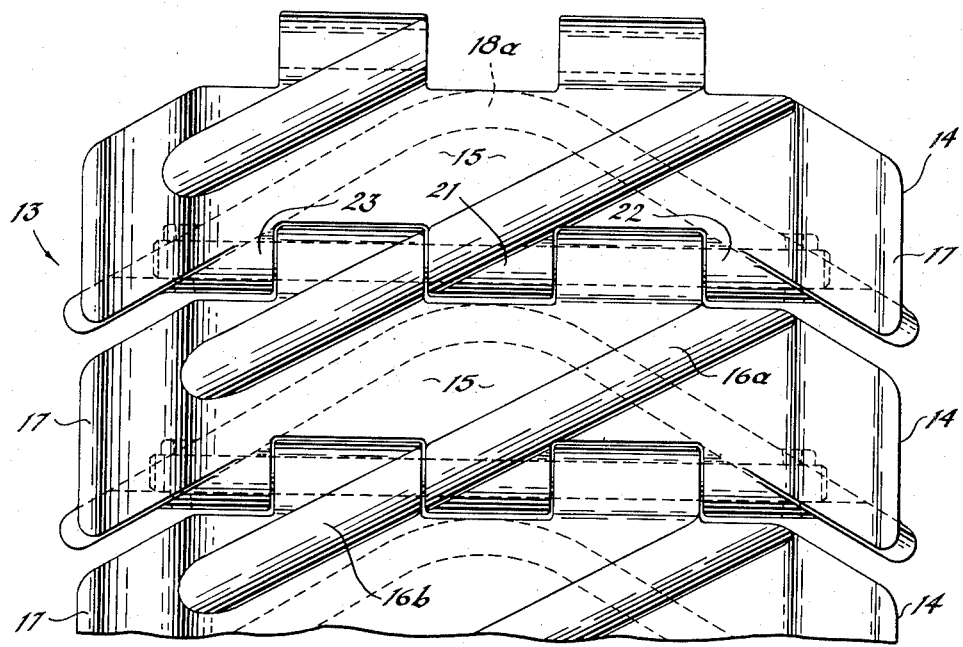
Fig. 4 is a top plan view enlarged of a portion of the track layed out flat, as for instance, the ground engaging portion of the track in Fig. 1.
Figure 5:
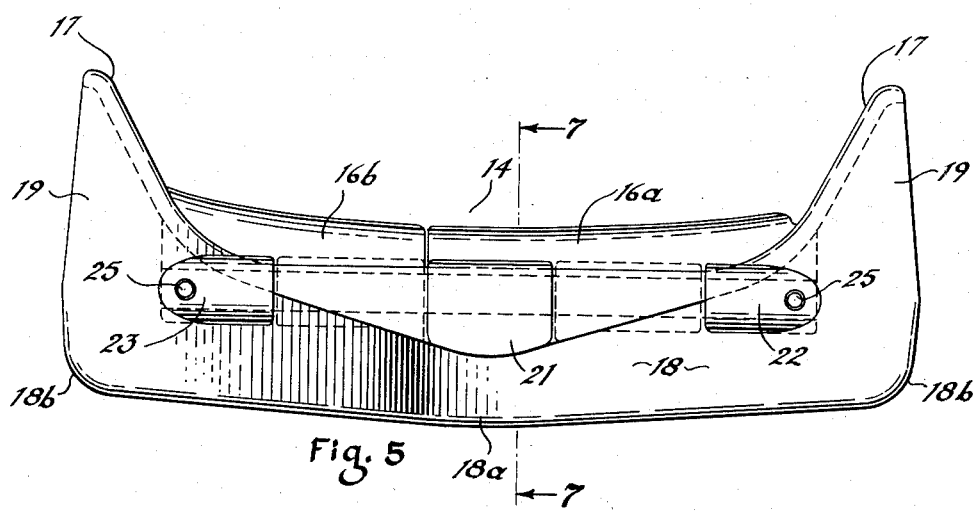
Fig. 5 is a side elevational view of one of the shoes of Fig. 4.
Figure 6:
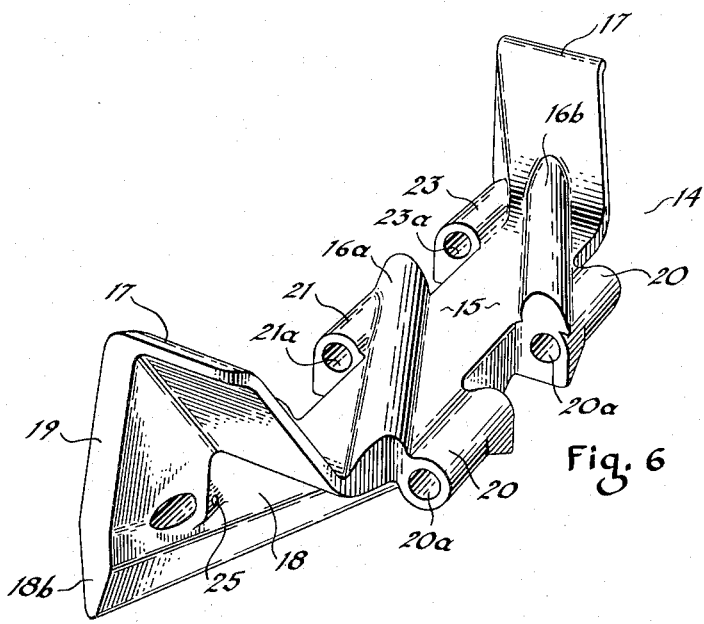
Fig. 6 is a perspective view of one of the shoes of Fig. 4.

Means is provided for hingedly connecting adjacent shoes together. For this purpose, two hinge lugs are provided in spaced apart relationship on that side of the shoe where the apex 18a of the grouser is found. Three hinge lugs 21, 22 and 23 are arranged along the opposite side of the shoe and so spaced apart that the lugs 20 of one shoe fit between the lugs 21, 22 and 23 of the adjacent shoe in a rather snug relationship as seen in Figs. 4 and 5. All of these lugs have through openings for the purpose of receiving a hinge pin 24. Each of these openings is given the same number as its hinge lug with the suffix a. It will be noted that the hinge lugs 22 and 23 merge into the wall 19 previously mentioned. Openings are provided at 25 through the hinge lugs 22 and 23 for the purpose of receiving pins to hold the hinge pins in place.

It will be noted that the grouser portions adjacent 18b cross and merge with the hinge lugs 22 and 23 which adds to the strength of the shoe and aids in keeping the shoe clean of dirt.

The tire engaging ridges in the shoes might be arranged in various ways but I have provided a novel arrangement as shown at 16a and 16b wherein each of the shoes has two parallel straight ridges respectively in left-hand and right-hand positions, and the right-hand ridge of one side is in alignment as a rectilinear continuation of the left-hand ridge of an adjacent shoe when the track is assembled as shown in Fig. 4.

Figure 7:
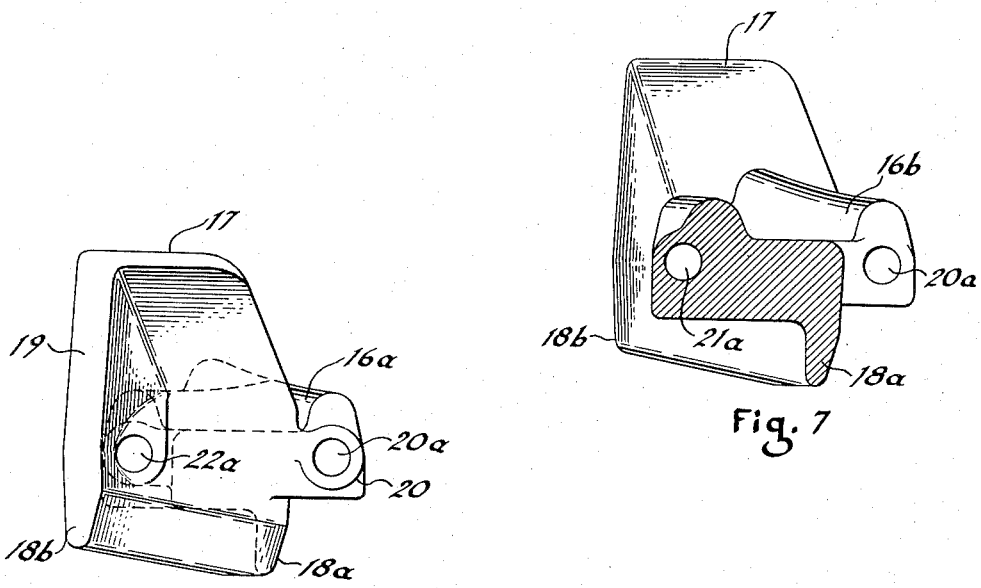
Figure 8:
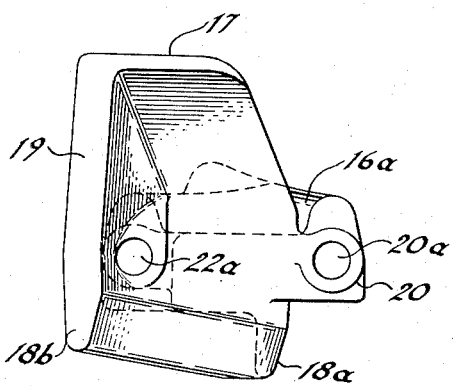
Fig. 8 is an end elevational view of a shoe taken from the right-hand end of Fig. 5.

As clearly seen in Figs. 5, 7 and 8, the ridge portions 16a and 16b are preferably of slightly greater extent above the surface 15 toward the outer ends of the shoe as compared with the height of these ridges toward the center of the shoe. This is so that the ridges of the track shoe will follow the contour of the grooves 12 in the tire tread, these grooves being deeper on each side than in the center.

In operation, the track 13 is assembled on the tire 10 with the tire in deflated condition. Some little effort must be exerted to assemble the track properly on the tire because the tracks must be tight on the tire. The tire is then inflated.

Figure 1:
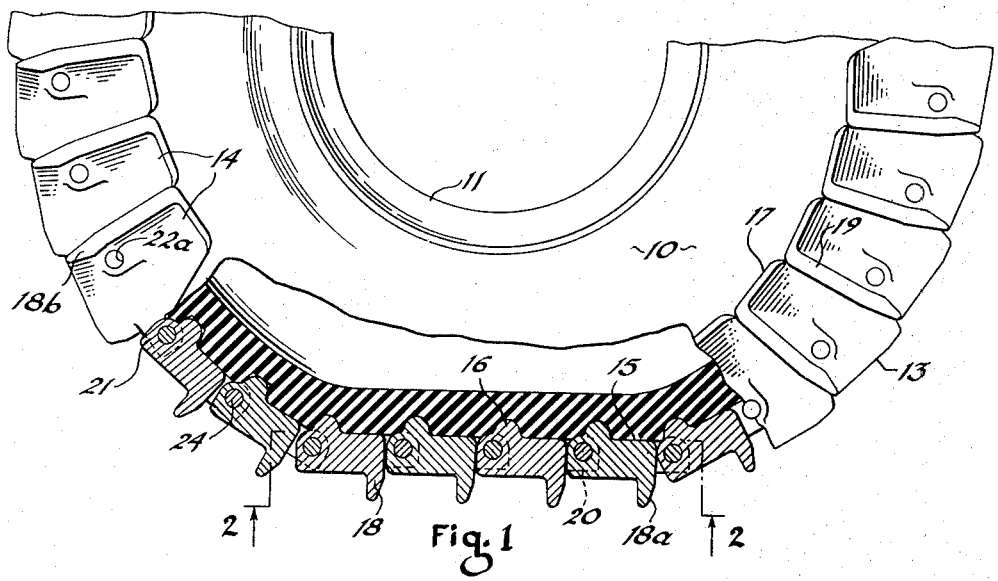
Fig. 1 is a side elevational view showing a pneumatic tire with my improved endless track in position on the tire, portions being broken away in central section, and with the entire combination under load.

The spacing between the ridges 16 of adjacent shoes, as shown in Fig. 1, is approximately equal to the spacing between the grooves 12 of the tire tread at those portions of the tire not engaging the ground. The number of shoes 14 is equal to the number of grooves 12 in the tire tread so that each of the assembled ridges 16 fits into and conforms in general contour to one of the grooves 12 in the tire. In other words, each ridge 16 always engages in the same groove 12 in the tire. It is obvious that the spacing of the grooves 12 at the ground engaging portion of the tire, under load, is slightly less than the spacing of these same grooves around the non-ground engaging portion of the tire. Therefore, the space between adjacent ridges of the track is a little greater than the spacing between adjacent grooves of the tread when the tire flattens on the ground under load. The rubber lugs or portions 10a of the tire tread between the grooves 12 and the side walls of the tire deform to compensate for the invariable pitch of the track shoe ridges as compared with the variable pitch of the grooves in the tire as between the ground engaging portions and other portions of the tire.

The grooves 12 in the tire become narrower under ground contact. The ridge portions 16a and 16b of the track shoes are made narrower than the grooves 12 as molded in the tire casing.

It will be understood that the track is assembled upon the tire so that the apex 18a of the grouser points in the direction of wheel rotation in the normal forward operation of the vehicle.

What I claim is:

1. In combination, a pneumatic tire having spaced grooves extending generally crosswise of its tread, an endless track completely surrounding and engaging the circumference of said tire, said track comprising a plurality of rigid shoes and articulating connections between adjacent shoes, said shoes having ridges at the same spacing as said grooves, said ridges fitting into said grooves entirely around said tire, each of said shoes having two parallel straight ridges respectively in left-hand and right-hand positions, and the right-hand ridge of one shoe in alignment as a rectilinear continuation of the left-hand ridge of an adjacent shoe of said track.

2. In combination, a pneumatic tire having spaced grooves extending generally crosswise of its tread, an endless track completely surrounding and engaging the circumference of said tire, said track comprising a plurality of rigid shoes and articulating connections between adjacent shoes, said shoes having ridges at the same spacing as said grooves, the number of said shoes in said track equalling the number of grooves in said tire, each of said shoes having a plurality of ridges, at least one of said ridges being in alignment with and continued by a ridge of an adjacent shoe of said track, and said ridges fitting into said grooves entirely around said tire.

3. In combination, a pneumatic tire having spaced grooves extending generally crosswise of its tread, said grooves opening outwardly at the side walls of the tire, an endless track completely surrounding and engaging the circumference of said tire, said track comprising a plurality of rigid shoes and articulating connections between adjacent shoes, each of said shoes having a generally flat tread engaging inner surface, said shoes having ridges carried by said flat tread engaging inner surfaces at the same spacing as said grooves, said ridges fitting into said grooves entirely around said tire, and said shoes having upwardly inclined end portions partially embracing the side walls of said tire.

4. The combination of claim 3 wherein the ridges in said shoes are narrower than the engaged grooves as molded in said tire in unstressed condition and the outer ends of said ridges extending radially inwardly beyond said generally flat surface of said shoes further than their central portions, thereby to permit the tire to accommodate itself to said track when said tire is flattened against the ground under load.

References Cited in the file of this patent

UNITED STATES PATENTS

| | | |
|---|---|---|
| 1,038,235 | Toso | Sept. 10, 1912 |
| 1,307,036 | Bretscher | June 17, 1919 |
| 1,425,356 | Allden | Aug. 8, 1922 |
| 2,046,299 | Armington | June 30, 1936 |

FOREIGN PATENTS

| | | |
|---|---|---|
| 269,378 | Switzerland | Oct. 16, 1950 |